Figure 1:
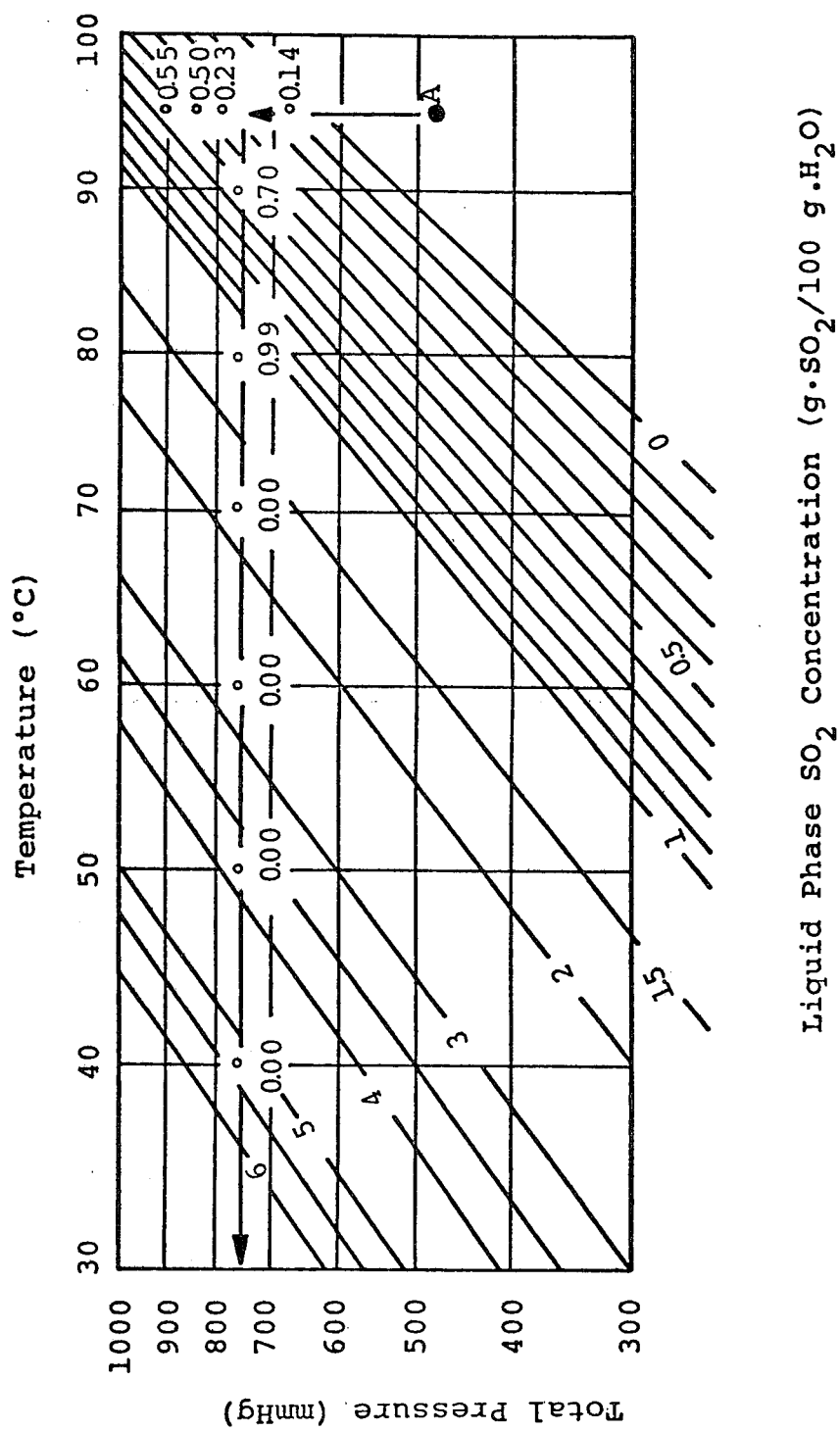

United States Patent [19]

Okubo et al.

[11] 4,115,148

[45] Sep. 19, 1978

[54] METHOD FOR PREVENTING CORROSION OF A SULFUR DIOXIDE REGENERATING APPARATUS

[75] Inventors: Masao Okubo; Masayoshi Miki, both of Niihama; Takeshi Ueda, Chiba, all of Japan

[73] Assignee: Sumitomo Chemical Company, Limited, Osaka, Japan

[21] Appl. No.: 733,282

[22] Filed: Oct. 15, 1976

[51] Int. Cl.² .............................................. B08B 7/04
[52] U.S. Cl. ........................................ 134/21; 55/46; 134/30; 134/42
[58] Field of Search ................... 134/21, 26, 30, 42; 55/46, 47

[56] References Cited

U.S. PATENT DOCUMENTS

| 1,341,114 | 5/1920 | Eustis | 55/46 X |
| 1,724,421 | 8/1929 | Richter | 55/46 X |

FOREIGN PATENT DOCUMENTS 1,187,053  4/1970  United Kingdom ............... 55/47

Primary Examiner—Marc L. Caroff
Attorney, Agent, or Firm—Birch, Stewart, Kolasch and Birch

[57] ABSTRACT

Corrosion of an $SO_2$ regeneration apparatus is prevented upon suspending its operation by introducing an inert gas into the apparatus to produce an air concentration of not more than 5% by volume therein and maintaining that concentration while reducing temperature in the apparatus to room temperature.

2 Claims, 1 Drawing Figure

METHOD FOR PREVENTING CORROSION OF A SULFUR DIOXIDE REGENERATING APPARATUS

The present invention relates to a method for preventing the corrosion of an apparatus wherein the separation of $SO_2$ from an $SO_2$-containing solution is carried out by heating.

In an apparatus wherein an $SO_2$-containing solution, for instance, obtained by contacting an $SO_2$-containing gas with an absorptive solution containing $Na_2SO_3$ dissolved in water is heated to release gaseous $SO_2$ therefrom (hereinafter referred to as "$SO_2$ regeneration apparatus"), it has been found that the portion which contacts the $SO_2$-containing solution is not substantially corroded but the portion which does not contact the $SO_2$-containing solution but contacts only the gaseous material containing $SO_2$ in the vacant space above the surface of the $SO_2$-containing solution has a great tendency to become corroded.

In a study for preventing the corrosion of an $SO_2$ regeneration apparatus at the said gaseous material contacting portion, experiments on the corrosion of test materials made of stainless steel SUS 304 (sensitized by heating at 650° C. for 2 hours and cooling in air) and stainless steel SUS 316L (sensitized by heating at 750° C. for 2 hours and cooling in air) with $SO_2$ in water (i.e. aqueous solution of $SO_2$) at 60° C. gave the results as shown in the following table 1:

Table 1

| Test material | $SO_2$ concentration (% by weight) | Corrosion rate (g/m².hr) | Corrosion state at surface |
|---|---|---|---|
| Stainless steel SUS 304 (sensitized) | 0.01 | 0.094 | General corrosion |
| | 0.03 | 0.198 | General Corrosion |
| | 0.1 | 0.915 | General corrosion |
| | 0.3 | 1.239 | Pitting |
| | 1 | 0.005 | Stress corrosion cracking |
| | 3 | 0.002 | No corrosion |
| | 9 | 0.001 | No corrosion |
| Stainless steel SUS 316L (sensitized) | 0.01 | 0.003 | No corrosion |
| | 0.03 | 0.130 | General corrosion |
| | 0.1 | 0.514 | General corrosion |
| | 0.3 | 0.004 | No corrosion |
| | 1 | 0.003 | No corrosion |
| | 3 | 0.004 | No corrosion |
| | 9 | 0.005 | No corrosion |

From the above results, it is understood that the corrosion of a stainless steel material is gradually increased with the elevation of the $SO_2$ concentration up to a certain limit and then becomes nonexistent at a higher concentration over this corrosion limit. The $SO_2$ concentration at such corrosion limit is varied with the kind of the stainless steel material, the condition of the heat treatment, the condition for the corrosion and the like. In case of the said experiments, the $SO_2$ concentration at the corrosion limit is about 3 % by weight for the stainless steel SUS 304 (sensitized) material and about 0.3 % by weight for the stainless steel SUS 316L (sensitized) material. The above tendency is substantially unchanged even if Na salts and/or $NH_4$ salts are present in the corrosion system, i.e. in the aqueous solution of $SO_2$. In practice, the $SO_2$-containing solution obtained by contacting an $SO_2$-containing gas with an absorptive solution containing $Na_2SO_3$ dissolved in water has an $SO_2$ concentration sufficiently over that at the corrosion limit. For instance, the $SO_2$-containing solution from which gaseous $SO_2$ is to be released by heating contains usually $SO_3^{--}$ and $HSO_3^-$ in concentrations of 3.37 % by weight and 21.95 % by weight, respectively. Because of this reason, the corrosion of $SO_2$ regeneration apparatus where the $SO_2$-containing solution contacts the apparatus is prevented.

In the vacant space above the surface of the $SO_2$-containing solution in the apparatus, there is present a gaseous mixture comprising $SO_2$ and water (steam), in which the $SO_2$ concentration is determined on the equilibrium as shown in FIG. 1 of the accompanying drawing. In FIG. 1 which shows a gas-liquid equilibrium of the $SO_2$-$H_2O$ system, the ordinate and the abscissa indicate respectively the total pressure and the temperature, and the numerals attached to the oblique lines indicate the $SO_2$ concentrations in liquid phase, i.e. the $SO_2$-containing solution. Point A represents the operation conditions of the $SO_2$ regeneration apparatus, and the numerals accompanied by (°) show respectively the corrosion rates of the stainless steel SUS 304 material (sensitized by heating at 650° C for 2 hours and cooling in air) at the temperatures as indicated. Since the gas phase at the operation conditions corresponding to Point A (temperature, 95° C.; pressure, 480 mmHg) is under a superheated state and the condensation of water does not occur, the gaseous material contacting portion of the apparatus is not corroded during the operation. (This fact is proved experimentally.)

When the operation of the apparatus is suspended at the conditions corresponding to Point A and then the pressure is elevated to the atmospheric pressure while maintaining the same temperature, the condensation of water starts at a pressure of 620 mmHg and the dissolution of $SO_2$ into the condenser water proceeds with an increase in the pressure. At a pressure of 1 atmosphere (i.e. 760 mmHg), $SO_2$ is dissolved in the condensed water at a concentration of 0.3 % by weight to produce an equilibrium. After reaching atmospheric pressure, the lowering of the temperature results in an increase in the concentration of $SO_2$ dissolved in the condensed water. The corrosion rate (g/m².hr) of the stainless steel SUS 304 material (sensitized by heating at 650° C. for 2 hours and cooling in air) under the $SO_2$-$H_2O$ equilibrium with such a change in the temperature is also shown in FIG. 1, and it corresponds quite well with the corrosion behavior as shown in the said table 1.

Based on the above experimental results and their analysis, it has now been found that the corrosion of an $SO_2$ regeneration apparatus at the gaseous material contacting portion can be prevented by controlling the $SO_2$ concentration in the $SO_2$-containing solution produced from the water condensed and the $SO_2$ dissolved therein as the result of the suspension of the operation of the apparatus and the lowering of the temperature in the apparatus below that of the corrosion limit. When the pressure is constant, the control may be made on the temperature.

It has also been found that the corrosion of an $SO_2$ regeneration apparatus, particularly made of stainless steel, is prevented by avoiding the introduction of air into the apparatus when opened to atmosphere after the suspension of the operation.

According to the present invention, there is provided a method for preventing the corrosion of an $SO_2$ regeneration apparatus, characterized in that an inert gas is introduced into the apparatus on the suspension of the operation so as to keep the air content therein not more than 5 % by volume and this air content is maintained until the apparatus is cooled to room temperature. The air content of more than 5 % by volume is undesirable, since the corrosion rate becomes larger at this level.

As the inert gas, there are exemplified nitrogen, argon, etc., among which nitrogen is the most favorable in easy availability and economy. The inert gas may contain air insofar as the said air content can be maintained.

The introduction of the inert gas into the apparatus is preferred to be effected at the earliest possible stage after the suspension of the operation. The possibility of corrosion is considerably lessened when the apparatus is cooled below about 70° C., but it is desirable to continue cooling to room temperature for the sake of assurance.

Practical and presently preferred embodiments of the present invention are illustratively shown in the following examples.

EXAMPLE 1

On suspension of the operation of an $SO_2$ regeneration apparatus (a stainless steel SUS 316L made tower having a diameter of 4 meters and a height of 10 meters without any packing material to be operated under reduced pressure) wherein an $SO_2$-containing solution obtained by contacting a waste gas from a boiler with an absorptive solution containing $Na_2SO_3$ dissolved in water to absorb $SO_2$ selectively therein had been heated to release $SO_2$ therefrom, the supply of the $SO_2$-containing solution thereto was interrupted while introducing nitrogen gas (purity, not less than 99% by volume) into the vacant space above the surface of the $SO_2$-containing solution therein, and the introduction of nitrogen gas was continued so as to make the pressure at the said vacant space atmospheric. While maintaining such pressure, the $SO_2$-containing solution in the apparatus was gradually taken out, and the inner wall of the apparatus was washed and cooled with water of room temperature, during which the oxygen content in the vacant space in the apparatus was kept below 1 % by volume (in the dried state). Thereafter, the manhole of the apparatus was opened.

As a result, it was observed that the proceeding of the corrosion produced on the previous opening in an ordinary manner ceased and no new corrosion was produced.

The apparatus was subjected several times to the operation in a usual manner and the subsequent suspension according to the present invention. Inspection of the apparatus revealed no advance in the corrosion previously produced and no production of any new corrosion. Thus, the apparatus could be continuously used with safety for a long period of time.

In the same apparatus as above which was, after the operation, opened to atmosphere and subjected to taking out of the $SO_2$-containing solution and washing of the inner wall with water in an ordinary manner, i.e. without introducing nitrogen gas therein, remarkable corrosion was observed at the wall surface which contacted with the gaseous material only.

REFERENCE EXAMPLE 1

The influence of the composition of a seal gas on the corrosion rate of stainless steel materials (SUS 304 and SUS 316L (sensitized) with an $SO_2$-containing solution (i.e. an aqueous solution of $SO_2$) wherein the $SO_2$ concentration varied with the lapse of time was tested at 80° C. The results are shown in the following table 2:

Table 2

| Composition of seal gas (% by volume) | Corrosion rate (Corrosion stab at surface) ($g/m^2 \cdot hr$) | | Remarks |
|---|---|---|---|
| | Stainless steel SUS 304 | Stainless steel SUS 316L | |
| 100 % Air | 5.67 (General corrosion) | 1.44 (General corrosion with pitting) | |
| 75 % Air + 25 % Nitrogen | 1.81 (Whole surface corroded) | 0.02 (Crevice corrosion) | |
| 50 % Air + 50 % Nitrogen | 2.94 (General corrosion) | 0.75 (General corrosion) | |
| 10 % Air + 90 % Nitrogen | 1.38 (General Corrosion) | 0.31 (General corrosion) | |
| 5 % Air + 95 % Nitrogen | 0.02 (No corrosion) | 0.01 (No corrosion) | Present invention |
| 5 % Air + 95 % Argon | 0.01 (No corrosion) | 0.01 (No corrosion) | Present invention |
| 100 % Nitrogen | 0.01 (No corrosion) | 0.00 (No corrosion) | Present invention |

What is claimed is:

1. In a method of cleaning an apparatus of stainless steel wherein an $SO_2$-containing absorption solution has been heated under subatmospheric pressure in said apparatus to release gaseous $SO_2$ from said solution, which comprises the steps of elevating the pressure in the apparatus to atmospheric pressure, lowering the temperature in the apparatus to room temperature, removing the absorption solution from the apparatus and washing the apparatus with water, the improvement which comprises preventing corrosion of the apparatus by effecting the elevation of the pressure to the atmospheric pressure by introducing an inert gas into the apparatus to produce an air concentration of not more than 5% by volume therein and by effecting the lowering of the temperature to room temperature while maintaining said air concentration in the apparatus.

2. The method of claim 1, wherein the $SO_2$-containing absorption solution is obtained by contacting an $SO_2$-containing waste gas with an absorptive solution containing $Na_2SO_3$ dissolved in water whereby $SO_2$ is selectively absorbed into the absorptive solution.

* * * * *